3,845,149
ISOMERIZATION OF ISOPROPYL NAPHTHALENE
Siegfried Pietzsch and Rudolf Wirtz, Kelkheim, Taunus, and Georg Schaeffer, Hofheim, Taunus, Germany, assignors to Farbwerke Hoechst Aktiengesellschaft vormals Meister Lucius & Bruning, Frankfurt am Main, Germany
No Drawing. Filed May 2, 1973, Ser. No. 356,406
Claims priority, application Germany, May 6, 1972, P 22 22 342.3
Int. Cl. C07c 5/28, 15/24
U.S. Cl. 260—668 A        5 Claims

ABSTRACT OF THE DISCLOSURE

Catalytic isomerization of α-isopropyl naphthalene to β-isopropyl naphthalene with aluminium chloride in amounts of 0.05 to 0.8% by weight of ethyl aluminium dichloride in amounts of 0.5 to 1.5% by weight or a mixture thereof, each calculated on the total quantity of the initial alkylated naphthalenes, the portion of the β-isomeric monoisopropyl naphthalene being at least 92%, calculated on the total mono-isomer portion and the total portion of the mono isopropyl naphthalene exceeding 70% by weight, calculated on the total amount of alkylated naphthalenes, at a temperature of from 40 to 200° C.

---

The present invention relates to a process for the isomerization of isopropyl-naphthalene.

β-Isopropyl-naphthalene is an important intermediate product for the preparation of β-naphthol according to Hock's process. β-Isopropyl-naphthalene is obtained by a Friedel-Crafts reaction of naphthalene with propene, but this reaction always yields the α-isomer as a by-product, sometimes in high amounts. The by-products obtained are polyisopropyl-naphthalenes, predominantly diisopropyl-naphthalenes. In order to prepare β-napthol with a high purity by oxidation of β-isopropyl-naphthalene, the β-isomeric starting compound has, however, to be also present with a very high purity. The α- and β-isomers can, however, not be separated by technically simple methods, for example by distillation, but the α-isopropyl-naphthalene has to be isomerized into its β-isomer.

The isomerization reaction is, however, complicated since it also yields, in a transalkylation reaction, higher alkylated naphthalenes and naphthalene itself. In many cases, a sufficiently high degree of isomerization towards the β-compounds is not attained. According to those known processes, for example α-isopropyl-naphthalene is converted in an isomer mixture into the β-compound in the presence of aluminium chloride as a catalyst which is used in an amount of more than 2% by weight, calculated on the total amount of alkylated naphthalene compounds.

In this manner, a mono-isopropyl-naphthalene mixture having a maximum content of 95 to 97% of β-isomer is obtained. According to such a process, the mono-isomer mixture isolated by the Friedel-Crafts alkylation of naphthalene is subjected alone or in the presence of naphthalene and poly-isopropyl-naphthalene to the rearrangement reaction, in each case using AlCl₃ (cf. Dutch Offenlegungsschrift No. 6,714,802; German Pat. No. 936,089; Doklady Akad.Nauk SSSR, vol. 179, No. 6 (1968), pages 1359–1361). In this latter case a reaction mixture obtained by propylation of naphthalene is directly used for the isomerization reaction.

In both cases the isomerization reaction catalyzed by means of aluminium chloride is accompanied by a transalkylation reaction, according to which part of the mono-isopropyl-naphthalene is converted into naphthalene and poly-isopropyl-naphthalene. Among the diisopropyl-naphthalenes 2,6-diisopropyl-naphthalenes is predominantly formed while the 1,6-isomer is formed to a minor extent.

Alternatively, it is also possible, as already mentioned above, to react poly-isopropyl-naphthalenes with naphthalene in the presence of aluminium chloride to yield mono-isopropyl-napthalene. In this transalkylation reaction, which is interestering for an increase in the yield of mono-isopropyl-naphthalene and is to be considered as a reconversion reaction from the economic point of view, the 2,6-isomer appears to be especially slow to react among the diisopropyl-naphthalenes. In the isomerization reactions, therefore, the yield of this diisopropyl isomer has to be kept as low as possible.

Since it is advantageous according to conventional processes not to isolate the mono-isopropyl-naphthalenes after propylation of naphthalene but already to isomerize them in the reaction mixture, the concentration of aluminium chloride in the isomerization reaction is accordingly from 2 to 18% by weight, calculated on the total amount of mono- and polyisopropyl-naphthalenes. Although an excellent degree of isomerization is attained thereby (α:β≦4:96), the accompanying transalkylation reaction is considerable, so that 35 to 40% by weight of alkylated naphthalene are obtained as polyisopropyl compounds. In addition, practically the whole portion of diisopropyl-napthalene obtained under these conditions consists of the 2,6-isomer which, as already mentioned, in contradistinction to 1,6-diisopropyl-naphthalene, is hardly suitable for a reconversion into mono-isopropyl-naphthalene by means of naphthalene. Thus, isomerization according to known methods involves a substantial loss of useful substance.

It has now been found that these disadvantages can surprisingly be avoided and mono-isopropyl-naphthalenes can be obtained in better yields and with a very high degree of isomerization towards the β-isomer, with regard to the higher alkylated compounds and to the reformed naphthalene, by carrying out the isomerization reaction of the α-isomer in the presence of only catalytical amounts of aluminium chloride or ethyl-aluminium dichloride.

The present invention therefore provides a process for by weight, advantageously from 0.1 to 0.3% by weight and in particular from 0.1 to 0.2% by weight, or ethyl aluminium chloride is used as a catalyst in an amount of from 0.05 to 0.8% by weight, preferably from 0.1 to 0.5% by weight, advantageously from 0.1 to 0.3% by weight and in particular from 0.1 to 0.2% by weight, or ethyl aluminium dichloride in an amount of from 0.5 to 1.5% by weight, preferably from 0.5 to 1% by weight or a mixture thereof, each calculated on the initial total amount of alkylated naphthalene compounds, the portion of the β-isomeric mono isopropyl naphthalene being at least 92%, calculated on the total mono isomer portion, and the total portion of the monoisopropyl naphthalene exceeding 70% by weight, calculated on the total amount of alkylated naphthalenes, at a temperature of from 40 to 200° C.

The isomerization reaction according to the invention may be carried out at temperatures of from 40 to 200° C., preferably from 60 to 135° C., advantageously from 60 to 120° C., more advantageously from 80 to 120° C. and in particular from 80 to 100° C.

Depending on the temperature chosen, the reaction period required covers a few minutes to several hours, for example 10 to 240 minutes, advantageously 30 minutes to 2 hours. In most cases, the reaction does not take more than 1 hour.

As far as the diisopropyl-naphthalenes are concerned, the process of the invention provides lower portions of 2,6-diisopropyl isomer, for example up to 84% instead of 97% as provided by the known processes.

In comparison to known processes, wherein isomerization is brought about with 2 to 18% by weight of aluminium chloride, the process of the invention has the crucial advantage of curtailing the undesired transalkylation reaction, which accompanies the isomer conversion as a side reaction, while substantially reducing the amount of catalyst used and providing the same degree of isomerization. The content of polyisopropyl-naphthalene in the isopropyl-substituted naphthalenes generally amounts to only 10 to 20% by weight instead of 35 to 40% by weight, and thus otherwise usual high loss of mono-isopropyl-naphthalene is decisively reduced.

The process of the invention is carried out in the following way: the mono-isopropyl-naphthalene mixture is mixed while stirring or shaking, alone or in admixture with naphthalene and/or poly-isopropyl-naphthalenes, with aluminium chloride or aluminium ethyl dichloride at room temperature or at a slightly elevated temperature, whereupon the catalyst amount is almost entirely dissolved, and then the mixture is heated, while continuously stirring, to the desired reaction temperature. After the reaction period required, dilute alkali metal hydroxide solution is added to the reaction mixture in order to eliminate aluminium chloride or aluminium-ethyl dichloride, the mixture is washed to neutral with water and the organic phase is decomposed. For being decomposed with alkali metal hydroxide solution and washed with water, the organic phase may advantageously be diluted with low-boiling inert solvents, such as ketones, benzene, halogenated hydrocarbons or carbon tetrahalides. Isomerization is advantageously performed at elevated temperatures, for example of from 80 to 120° C., for which a reaction period of at most 1 hour is generally required.

The following Examples serve to illustrate the invention.

EXAMPLE 1

0.1 g. (0.1% by weight) of anhydrous aluminium chloride was added while stirring, at 30° C., to 100 g. of a product obtained by propylation of naphthalene and containing, in addition to 52 g. of $\beta$-isopropyl-naphthalene and 37 g. of $\alpha$-isopropyl-naphthalene, 1.5 g. of 1,6-diisopropyl-naphthalene and 9.5 g. of 2,6-diisopropyl-naphthalene. After a reaction period of 30 minutes at 120° C., the catalyst was separated from the reaction mixture by means of dilute sodium hydroxide solution and the product was washed to neutral with water.

A gas chromatogram showed that the organic phase still contained 84% of the initial mono-isopropyl-naphthalene having a ratio of $\alpha$- to $\beta$-isomer of 5:95. The content of naphthalene was 7, that of diisopropyl-naphthalene was 18% by weight. 90% of the diisopropyl-naphthalene consisted of 2,6-isomer.

Naphthalene, mono-isopropyl-naphthalenes and diisopropyl-naphthalenes could be separated by fractionated distillation.

COMPARATIVE EXAMPLE 2

As disclosed in Example 1, the same amount of the product obtained by said naphthalene propylation was heated for 30 minutes at 120° C. with 1% by weight of anhydrous aluminium chloride. After work-up of the reaction mixture as disclosed in Example 1, an organic phase was obtained, which only contained 57% of the initial mono-isopropyl-naphthalene having an $\alpha/\beta$-ratio of 3/97. The content of naphthalene was 16% and that of diisopropyl-naphthalene was 26% by weight. The content of higher alkylated naphthalenes was 7% by weight. 96% of the diisopropyl-naphthalene consisted of the 2,6-isomer.

EXAMPLE 3

0.15 g. (0.15% by weight) of anhydrous aluminium chloride was added while stirring, at 40° C., to 100 g. of a product obtained by a naphthalene propylation and containing, in addition to 34 g. of $\alpha$-isopropyl-naphthalene and 50 g. of $\beta$-isopropyl-naphthalene, 6 g. of naphthalene, 1.4 g. of 1,6-diisopropyl-naphthalene and 8.6 g. of 2,6-diisopropyl-naphthalene. After heating and reacting for 2 hours at 120° C., the catalyst was separated from the reaction mixture by means of dilute sodium hydroxide solution and the product was washed to neutral with water.

The organic phase still contained 91% of the initial mono-isopropyl-naphthalene having an $\alpha/\beta$-ratio of 7/93. The content of naphthalene was 8% and that of diisopropyl-naphthalene was 16% by weight. 85% of the diisopropyl-naphthalene were 2,6-isomer.

EXAMPLE 4

0.7 Part by weight (0.8% by weight) of anhydrous aluminium chloride was added while stirring to 90 parts by weight of mono-isopropyl-naphthalene containing, in addition to 48 parts by weight of $\alpha$-isomer, 42 parts by weight of the $\beta$-compound. After a reaction period of 1 hour at 60° C., the catalyst was separated from the reaction mixture by means of dilute sodium hydroxide solution and the product was washed to neutral with water. The organic phase still contained 72% of the initial mono-isopropyl-naphthalene having an $\alpha/\beta$-ratio of 4/96. The content of naphthalene was 8% and that of diisopropyl-naphthalene was 21% by weight.

COMPARATIVE EXAMPLE 5

2.7 g. (2.9% by weight) of anhydrous aluminium chloride were added while stirring to 90 parts by weight of mono-isopropyl-naphthalene containing, in addition to 48 parts by weight of $\alpha$-isomer, 42 parts by weight of the $\beta$-compound. After a reaction period of 1 hour at room temperature, the catalyst was separated from the reaction mixture by means of dilute sodium hydroxide solution and the product was washed to neutral with water. The organic phase still contained 77% of the initial mono-isopropyl-naphthalene having an $\alpha/\beta$-ratio of only 13/87. The content of naphthalene was 9%, that of diisopropyl-naphthalene was 14% by weight.

COMPARATIVE EXAMPLE 6

When the same amount of mono - isopropyl - naphthalene having the same $\alpha/\beta$-ratio as in Example 5 was used but only 0.9 part by weight (1% by weight) of aluminium chloride was added, the mixture was thoroughly stirred for 1 hour at 20° C. and worked up as indicated above, the analytical data compiled in the following Table were obtained.

COMPARATIVE EXAMPLE 7

The same amount of mono - isopropyl - naphthalene as indicated in Example 5 was heated at 85° C. for 1 hour with 2.9% by weight of anhydrous aluminum chloride. After the reaction mixture had been worked up as described in Example 5, the organic phase still contained only 51% by weight of the initial mono - isopropyl - naphthalene having an $\alpha/\beta$-ratio of 3/97. The content of naphthalene was 19%, that of diisopropylnaphthalene was 25% and that of higher alkylated naphthalenes was 5% by weight. 97% of the diisopropyl-naphthalene consisted of 2,6-isomer.

EXAMPLE 8

0.05 g. (0.17% by weight) of anhydrous aluminium chloride was added while stirring to 30 g. of mono - isopropyl - naphthalene containing, in addition to 12 g. of $\alpha$-isomer, 18 g. of the $\beta$-compound. After a reaction period of 60 minutes at 80° C., the catalyst was separated from the reaction mixture by means of dilute sodium hydroxide solution and the product was washed to neutral water. The organic phase of the reaction mixture which had been worked up still contained 84% of the initial mono - isopropyl - naphthalene having an $\alpha/\beta$-ratio of 6/94. The content of naphthalene was 6% and that of diisopropyl-naphthalene was 10% by weight. 84% of the diisopropyl-naphthalene were the 2,6-isomer.

EXAMPLE 9

0.7 g. (0.7% by weight) of aluminium-ethyl dichloride was added while stirring, at 35° C., to 100 g. of a product obtained by naphthalene propylation and containing, in addition to 37 g. of α-isopropyl - naphthalene and 53 g. of β-isopropyl - naphthalene, 1.4 g. of 1,6-diisopropyl-naphthalene and 8.6 g. of 2,6-diisopropyl - naphthalene. After a reaction period of 1 hour at 100° C., the catalyst was separated from the reaction mixture by means of dilute sodium hydroxide solution and the product was washed to neutral with water.

The organic phase still contained 83% of the initial mono - isopropyl - naphthalene having an α/β-ratio of 3/97. The content of naphthalene was 6% and that of diisopropyl - naphthalene was 19% by weight. 89% of the diisopropyl - naphthalene were 2,6-isomer.

The following Table comprises further isomerization examples for the illustration of the process of the invention as well as Examples 1 to 9 for the purpose of a better survey.

The hydrocarbons are hereinafter abbreviated by the following symbols:

N'ene=naphthalene
IPN=mono-isopropyl-naphthalene
DIPN=diisopropyl-naphthalene and
PIPN=poly-isopropyl-naphthalene.

We claim:

1. A process for the isomerization of α-isopropyl-naphthalene to β-isopropyl naphthalene with an aluminium chloride cataylst which comprises using as a catalyst aluminium chloride in amounts of 0.05 to 0.8% by weight or ethyl aluminium dichloride in amounts of 0.5 to 1.5% by weight or a mixture thereof, each calculated on the total quantity of the initial alkylated naphthalenes, the portion of the β-isomeric mono - isopropyl naphthalene being at least 92%, calculated on the total mono-isomer portion and the total portion of the mono-isopropyl-naphthalene exceeding 70% by weight, calculated on the total amount of alkylated naphthalenes, at a temperature of from 40 to 200° C.

2. A process as claimed in claim 1 wherein after the isomerization the isomer proportion of α:β is 4:96 and smaller.

3. A process as claimed in claim 1, wherein after the isomerization the portion of mono-isopropyl-naphthalene is superior to 80% by weight, calculated on the total amount of alkylated naphthalenes.

4. A process as claimed in claim 1, wherein the isomerization reaction is carried out at a temperature of from 80 to 100° C.

5. A process as claimed in claim 1, wherein the isomerization reaction is carried out in the presence of naphthalene or polyalkylated naphthalenes or a mixture thereof.

TABLE

| Example number | Input | | | | | | | Reaction period, hrs. | Temp., °C. | Output | | | | | |
|---|---|---|---|---|---|---|---|---|---|---|---|---|---|---|---|
| | N'ene [a] | IPN | | DIPN | | AlXCl₂ | | | | N'ene [a] | IPN | | DIPN | | PIPN incl. DIPN [b] |
| | | α:β | [b] | 1,6-[b] | 2,6-[b] | X=Cl [b] | X=C₂H₅ [b] | | | | α:β | [b] | 1,6-[c] | 2,6-[c] | |
| 1 | | 41:59 | 89 | 1.5 | 9.5 | 0.1 | | 0.5 | 120 | 7 | 5:95 | 81 | 10 | 90 | 1 |
| 2 | | 41:59 | 89 | 1.5 | 9.5 | 1.0 | | 0.5 | 120 | 16 | 3:97 | 61 | 4 | 96 | 3 |
| 3 | 6 | 41:59 | 89 | 1.4 | 8.6 | 0.15 | | 2 | 120 | 8 | 7:93 | 82 | 15 | 85 | 2 |
| 4 | | 54:46 | 100 | | | 0.8 | | 1 | 60 | 8 | 4:96 | 78 | 7 | 93 | 25 |
| 5 | | 54:46 | 100 | | | 2.9 | | 1 | 20 | 9 | 13:87 | 85 | 11 | 89 | 12 |
| 6 | | 54:46 | 100 | | | 1.0 | | 1 | 20 | 7 | 11:89 | 88 | | | 18 |
| 7 | | 54:46 | 100 | | | 2.9 | | 1 | 85 | 19 | 3:97 | 62 | 3 | 97 | 31 |
| 8 | | 41:59 | 100 | | | 0.17 | | 1 | 80 | 6 | 6:94 | 89 | 16 | 84 | 10 |
| 9 | | 41:59 | 90 | 1.4 | 8.6 | | 0.7 | 1 | 100 | 6 | 3:97 | 80.5 | 11 | 89 | 25 |
| 10 | | 41:59 | 90 | 1.4 | 8.6 | | 0.9 | 0.5 | 120 | 8 | 2:98 | 75 | 6 | 94 | 26 |
| 11 | | 41:59 | 100 | | | 0.15 | | 0.5 | 100 | 8 | 4:96 | 84 | 13 | 87 | 13 |
| 12 | | 41:59 | 100 | | | 0.15 | | 0.5 | 120 | 11 | 5:95 | 77 | 10 | 90 | 27 |
| 13 | | 54:46 | 100 | | | 0.5 | | 0.5 | 80 | 10 | 5:95 | 83 | 8 | 92 | 19 |
| 14 | | 54:46 | 100 | | | 0.5 | | 0.5 | 120 | 17 | 5:95 | 71 | 5 | 95 | 29 |

[a] In percent by weight, calculated on N'ene plus IPN plus PIPN.
[b] In percent by weight, calculated on IPN plus PIPN.
[c] In percent by weight, calculated on 1,6-plus 2,6-DIPN.

References Cited
UNITED STATES PATENTS
2,771,491   11/1956   Conner _____ 260—668 F CURTIS R. DAVIS, Primary Examiner U.S. Cl. X.R.
260—668 F